United States Patent
Chen (10) Patent No.: US 10,939,751 B1
(45) Date of Patent: Mar. 9, 2021

(54) ADJUSTABLE BAR, LEG ASSEMBLY AND TABLE HAVING SAME

(71) Applicant: Inno-Sports Co., Ltd., Xiamen (CN)

(72) Inventor: Renhua Chen, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 0 days.

(21) Appl. No.: 15/931,925

(22) Filed: May 14, 2020

(30) Foreign Application Priority Data

Aug. 30, 2019 (CN) .......................... 201921436899.6
Oct. 9, 2019 (CN) .......................... 201921680777.1

(51) Int. Cl.
*A47B 3/00* (2006.01)
*A47B 9/16* (2006.01)
*A47B 9/14* (2006.01)

(52) U.S. Cl.
CPC ................ *A47B 9/16* (2013.01); *A47B 3/002* (2013.01); *A47B 9/14* (2013.01); *A47B 2003/006* (2013.01)

(58) Field of Classification Search
CPC ..... A47B 3/002; A47B 2003/006; A47B 9/14; A47B 9/16; Y10T 403/32467; Y10T 403/32483; Y10T 403/32508; E04H 15/46; E04H 15/60
See application file for complete search history.

(56) References Cited

U.S. PATENT DOCUMENTS

| | | | |
|---|---|---|---|
| 893,364 A | 7/1908 | Piaser | |
| 1,196,253 A | 8/1916 | Lovvy | |
| 1,599,971 A | 9/1926 | Melson | |
| 3,027,209 A * | 3/1962 | Nielsen | A47B 91/02 108/146 |
| 3,188,138 A | 6/1965 | Lockshin | |
| 4,597,553 A * | 7/1986 | Rorabaugh | A63B 21/00047 108/117 |
| 4,773,108 A | 9/1988 | Leever | |
| 5,331,725 A | 7/1994 | Chou | |
| 6,062,589 A | 5/2000 | Cheng | |
| 6,223,628 B1 | 5/2001 | Barron | |
| 6,575,656 B2 | 6/2003 | Suh | |
| 6,938,927 B1 | 9/2005 | Martin | |
| 7,066,676 B2 | 6/2006 | Tsai | |

(Continued)

FOREIGN PATENT DOCUMENTS

CN 201767333 U * 3/2011
CN 204336376 U 5/2015

(Continued)

OTHER PUBLICATIONS

English Translation of Cui (CN209185860) (Year: 2020).*
English Translation of Cui (CN201767333U) (Year: 2020).*

*Primary Examiner* — Matthew W Ing
(74) *Attorney, Agent, or Firm* — Morgan, Lewis & Bockius LLP (57) ABSTRACT

A table includes a tabletop and a leg assembly to support the tabletop. The leg assembly includes first and second supports each movably connected with the table top. The leg assembly also includes an adjustable bar disposed substantially perpendicular to a height direction of the leg assembly. The adjustable bar has a first end connected with the first support and a second end connected with the second support such that changing a length of the adjustable bar changes a height of the leg assembly.

20 Claims, 9 Drawing Sheets

(56) References Cited

U.S. PATENT DOCUMENTS

| | | |
|---|---|---|
| 7,144,078 B2 | 12/2006 | Hsieh |
| 7,849,867 B2 | 12/2010 | Takayama |
| 7,874,303 B2 | 1/2011 | Xie |
| 8,707,478 B2 | 4/2014 | Jin |
| 8,806,677 B1 | 8/2014 | Bartelsmeyer |
| 8,856,984 B1 | 10/2014 | Donham |
| 8,888,123 B1 | 11/2014 | Cheng |
| 9,027,952 B2 | 5/2015 | Zhu |
| 9,107,509 B2 | 8/2015 | Lee |
| 9,248,072 B2 | 2/2016 | Wu |
| 9,254,046 B1 | 2/2016 | Arenstein |
| 9,314,386 B1 | 4/2016 | Boyd |
| 9,456,698 B2 | 10/2016 | Oh |
| 9,532,645 B1* | 1/2017 | Lin ............... A47B 23/046 |
| 9,907,405 B2 | 3/2018 | An |
| 10,021,986 B1 | 7/2018 | Lin |
| 10,123,629 B2 | 11/2018 | Choi |
| 10,125,801 B2 | 11/2018 | Wilson |
| 10,285,506 B2 | 5/2019 | Choi |
| 2003/0009848 A1 | 1/2003 | Kuo |
| 2005/0274304 A1* | 12/2005 | Strong ............... A47B 3/083 108/159 |
| 2006/0062632 A1 | 3/2006 | Jang |
| 2007/0012346 A1* | 1/2007 | Choi ............... F16B 7/105 135/114 |
| 2009/0133191 A1 | 5/2009 | Harrow |
| 2009/0255564 A1* | 10/2009 | Xie ............... E04H 15/50 135/145 |
| 2010/0176634 A1 | 7/2010 | Wahl |
| 2010/0299831 A1 | 12/2010 | Lee |
| 2011/0099712 A1 | 5/2011 | Jin |
| 2012/0107037 A1* | 5/2012 | Huang ............... F16B 7/105 403/109.3 |
| 2012/0141195 A1* | 6/2012 | Lu ............... A47C 4/00 403/315 |
| 2012/0222216 A1 | 9/2012 | Jin |
| 2013/0067659 A1 | 3/2013 | Oh |
| 2013/0276228 A1 | 10/2013 | Hsieh |
| 2015/0130250 A1 | 5/2015 | Masunaga |
| 2015/0143630 A1 | 5/2015 | Harrow |
| 2015/0320225 A1 | 11/2015 | Boyd |
| 2015/0327684 A1 | 11/2015 | Lee |
| 2016/0157620 A1 | 6/2016 | Oh |
| 2016/0348395 A1* | 12/2016 | Jin ............... E04H 15/26 |
| 2017/0122353 A1 | 5/2017 | Halliburton |
| 2018/0192768 A1* | 7/2018 | Choi ............... A47B 13/02 |
| 2019/0200753 A1* | 7/2019 | Choi ............... A47B 13/003 |

FOREIGN PATENT DOCUMENTS

| | | |
|---|---|---|
| CN | 204336377 U | 5/2015 |
| CN | 209185860 U | 8/2019 |
| GB | 810195 A | 3/1959 |

* cited by examiner

ADJUSTABLE BAR, LEG ASSEMBLY AND TABLE HAVING SAME

CROSS-REFERENCE TO RELATED APPLICATIONS

The present application claims priority to Chinese Utility Model Applications CN 201921436899.6 filed Aug. 30, 2019 and CN 201921680777.1 filed Oct. 9, 2019. The disclosure of each application is incorporated herein for all purposes by reference in its entirety.

FIELD OF THE INVENTION

The present invention generally relates to tables, and in particular, relates to adjustable bars, height-adjustable leg assemblies and height-adjustable tables.

BACKGROUND

Most of existing foldable tables are not adjustable in height. Some existing tables are adjustable through a control switch. For instance, CN209185890U discloses a foldable table with a control switch, the disclosure of which is incorporated herein for all purposes by reference in its entirety. However, the control switch is often not protected or locked. End users may press the switch by accident or children may play with the switch out of curiosity, causing unexpected folding or collapsing of the table. In some cases, this may lead to hands caught by the table or other safety issues.

Given the current state of the art, there remains a need for adjustable bars, leg assemblies and tables that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides adjustable bars, height-adjustable leg assemblies and height-adjustable tables.

In various exemplary embodiments, the present disclosure provides an adjustable bar including an outer tubular bar, an inner bar and a locking/unlocking mechanism. The outer tubular bar includes a first restriction hole formed on a first wall of the outer tubular bar. The inner bar includes a proximal end disposed inside the outer tubular bar, a distal end disposed outside of the outer tubular bar, and at least one restriction member. The at least one restriction member includes a second restriction hole formed at a first wall of the inner bar corresponding to the first restriction hole of the outer tubular bar. The locking/unlocking mechanism is configured to control movement of the inner bar with respect to the outer tubular bar. The locking/unlocking mechanism includes a base, a casing and a cover. The base is fixedly coupled with the outer tubular bar. The casing is integrally formed or coupled with the base for housing a pin. The pin is selectively inserted into the first restriction hole of the outer tubular bar and the second restriction hole of the inner bar, thereby selectively restricting movement of the inner bar with respect to the outer tubular bar. The cover has a first portion pivotally coupled with the casing and a second portion snap-fitted with the casing. The cover prevents accidental release of the pin from the second restriction hole of the inner bar or from both of the first restriction hole of the outer tubular bar and the second restriction hole of the inner bar.

In an exemplary embodiment, the casing includes a hole formed at a first side wall of the casing for pivotally coupling the first portion of the cover and a protrusion at a second side wall of the casing for snap-fitting the second portion of the cover.

In various exemplary embodiments, the present disclosure provides an adjustable bar including an outer tubular bar, an inner bar, and a locking/unlocking mechanism. The outer tubular bar includes a first restriction hole formed on a first wall of the outer tubular bar. The inner bar includes a proximal end disposed inside the outer tubular bar, a distal end disposed outside of the outer tubular bar, and at least one restriction member. The at least one restriction member includes one or more one-way restriction structures disposed between the proximal end and distal end of the inner bar and spaced apart along a length direction of the inner bar. Each one-way restriction structure in the one or more one-way restriction structures includes a restriction slot and a restriction tongue. The restriction slot is formed at a first wall of the inner bar and including a proximal edge toward the proximal end of the inner bar and a distal edge toward the distal end of the inner bar. The restriction tongue is integrally formed or connected with one of the proximal and distal edges of the restriction slot and curved inwardly with respect to the first wall of the inner bar along the length direction of the inner bar toward the other of the proximal and distal edges of the restriction slot. The locking/unlocking mechanism is configured to control movement of the inner bar with respect to the outer tubular bar. The locking/unlocking mechanism includes a pin to be selectively inserted into the first restriction hole of the outer tubular bar and the restriction slot of any one of the one or more one-way restriction structures of the inner bar, thereby selectively restricting the inner bar from moving along the length direction of the outer tubular bar in one direction but allowing the inner bar to move along the length direction of the outer tubular bar in another direction.

In an exemplary embodiment, the restriction tongue is integrally formed or connected with the distal edge of the restriction slot and curved inwardly with respect to the first wall of the inner bar along the length direction of the inner bar toward the proximal edge of the restriction slot, thereby selectively restricting the inner bar from moving away from the outer tubular bar along the length direction of the outer tubular bar but allowing the inner bar to move toward the outer tubular bar along the length direction of the outer tubular bar.

In some exemplary embodiments, the at least one restriction member further includes a second restriction hole formed at the first wall of the inner bar between the proximal and distal ends of the inner bar. The pin is selectively inserted into the first restriction hole of the outer tubular bar and the second restriction hole of the inner bar, thereby restricting the inner bar from moving along the length direction of the outer tubular bar.

In some exemplary embodiments, the locking/unlocking mechanism further includes a base, a casing, a lever and an elastic member. The base includes a base hole and a base pillar formed at a first side wall of the base, wherein the base hole is aligned with the first restriction hole of the outer tubular bar. The casing is integrally formed or coupled with the first side wall of the base and surrounding the base hole and the base pillar. The lever includes a first end portion aligned with the base hole, a second end portion aligned with the base pillar, and a middle portion between the first and second portions and pivotally connected with the casing. The pin is integrally formed or coupled with the first end portion of the lever, and has a free end toward the base hole. The elastic member is engaged with the base pillar, and has a first end abutting the first side wall of the base and a second end abutting the second portion of the lever. When the restriction slot of any one of the one or more one-way restriction structures of the inner bar aligns with the first restriction hole of the outer tubular bar, the elastic member pushes the pin into the restriction slot of the inner bar.

In some exemplary embodiments, pressing the second portion of the lever toward the base removes the pin from the restriction slot of the inner bar or from both of the restriction slot of the inner bar and the first restriction hole of the outer tubular bar, thereby allowing the inner bar to move along the length direction of the outer tubular bar.

In some exemplary embodiments, the locking/unlocking mechanism further includes a base fixedly coupled with the outer tubular bar, a casing integrally formed or coupled with the base for housing the pin, and a cover having a first portion pivotally coupled with the casing and a second portion snap-fitted with the casing. The cover prevents accidental release of the pin from the restriction slot of any one of the one or more one-way restriction structures of the inner bar or from both of the first restriction hole of the outer tubular bar and the restriction slot of the inner bar.

In various exemplary embodiments, the present disclosure provides a leg assembly including a first support, a second support, and any one of the adjustable bars disclosed herein. The adjustable bar is disposed substantially perpendicular to a height direction of the leg assembly. The adjustable bar has a first end connected with the first support and a second end connected with the second support such that changing a length of the adjustable bar changes a height of the leg assembly.

In some exemplary embodiments, when the pin is inserted into the first restriction hole of the outer tubular bar and the second restriction hole of the inner bar, adjusting the height of the leg assembly is restricted.

In some exemplary embodiments, when the pin is inserted into the first restriction hole of the outer tubular bar and the restriction slot of any one of the one or more one-way restriction structures of the inner bar, reducing the height of the leg assembly is restricted and increasing the height of the leg assembly is allowed.

In various exemplary embodiments, the present disclosure provides a table including a tabletop and any one of the leg assemblies disclosed herein to support the tabletop.

In some exemplary embodiments, the first and second supports collectively form a pair of scissor lifts that are spaced apart, with each scissor lift including one or more pairs of crisscrossed bars. The pair of scissor lifts is connected with each other by a first horizontal bar and a second horizontal bar. In an exemplary embodiment, the adjustable bar has the first end connected with the first horizontal bar and the second end connected with the second horizontal bar.

In some exemplary embodiments, each of the first and second supports includes a first bar, a second bar, a third bar, a fourth bar and a horizontal bar. The first and second bars are pivotally connected with each other at proximal ends thereof. The third and fourth bars are pivotally connected with each other at proximal ends thereof. The third and fourth bars are spaced apart from the first and second bars. The horizontal bar has a first end connected with the proximal end of the first or second bar, and a second end connected with the proximal end of the third or fourth bar. The first, second, third, and fourth bars of the first support are pivotally connected with the first, second, third, and fourth bars of the second support, respectively, at their middle portions. The adjustable bar has the first end connected with the horizontal bar of the first support and the second end connected with the horizontal bar of the second support.

In some exemplary embodiments, each of the first and second supports further includes an upper crossbar and a lower crossbar. The upper crossbar is movably connected with the tabletop. The distal ends of the first and third bars are connected to the upper crossbar. The distal ends of the second and fourth bars are connected to the lower crossbar.

In an exemplary embodiment, the lower crossbar includes first and second free ends bent downward, wherein an anti-slip base is coupled to each of the first and second free ends of the lower crossbar.

In various exemplary embodiments, the present disclosure provides a table including a tabletop and a leg assembly. The tabletop includes first, second, third and fourth engagement slots. The first and second engagement slots are spaced apart in a first direction of the tabletop with openings of the first and second engagement slots facing each other. The third and fourth engagement slots are spaced apart in the first direction of the tabletop with openings of the third and fourth engagement slots facing each other. The leg assembly includes a first support, a second support and an adjustable bar. The first support includes a first upper crossbar having a first end received in the first engagement slot and a second end received in the second engagement slot such as the first upper crossbar is slidable along the first and second engagement slots in a second direction of the tabletop and rotatable crosswise with respect to the first and second engagement slots. The second support includes a second upper crossbar having a first end received in the third engagement slot and a second end received in the fourth engagement slot such as the second upper crossbar is slidable along the third and fourth engagement slots in the second direction of the tabletop and rotatable crosswise with respect to the third and fourth engagement slots. The adjustable bar is connected with the first and second supports and configured to selectively move one or more of the first and second upper crossbars toward each other or away from each other, thereby changing a height of the leg assembly.

In some exemplary embodiments, each of the first, second, third and fourth engagement slots is formed at least partially by a pair of protrusions and a holding piece. The pair of protrusions includes a first protrusion and a second protrusion that are spaced apart in the second direction of the tabletop, integrally formed or coupled with the lower surface of the tabletop, and protruded downward from the lower surface of the tabletop. The holding piece is fastened on first and second protrusions of the tabletop.

In some exemplary embodiments, each of the first and second supports further includes a first bar, a second bar, a third bar, a fourth bar and a horizontal bar. The first and second bars are pivotally connected with each other at their proximal ends. The third and fourth bars are pivotally connected with each other at their proximal ends, and are spaced apart from the first and second bars of the first and second supports. The horizontal bar has a first end connected with the proximal end of the first or second bar, and a second end connected with the proximal end of the third or fourth bar. Distal ends of the first and third bars of the first support are connected to the first upper crossbar. Distal ends of the first and third bars of the second support are connected to the first upper crossbar. The first, second, third, and fourth bars of the first support are pivotally connected with the first, second, third, and fourth bars of the second support, respectively, at their middle portions. The adjustable bar has a first end connected with the horizontal bar of the first support and a second end connected with the horizontal bar of the second support. As such, changing a length of the adjustable bar moves one or more of the first and second upper crossbars toward each other or away from each other, thereby changing the height of the leg assembly.

The adjustable bars, leg assemblies and tables of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of adjustable bars, leg assemblies having such adjustable bars, and tables having such leg assemblies. An adjustable bar of the present disclosure generally includes an inner bar, an outer bar and a locking/unlocking mechanism configured to control the movement of the inner and outer bars relative to each other. In some exemplary embodiments, the inner bar is selectively allowed to move along the length direction of the outer bar in one direction but restricted from moving along the length direction of the outer bar in another direction. In some exemplary embodiments, the inner bar is selectively restricted from moving along the length direction of the outer bar in both directions.

A leg assembly of the present disclosure generally includes a first support, a second support and an adjustable bar. The adjustable bar has a first end connected with the first support and a second support such that changing the length of the adjustable bar changes the height of the leg assembly. In various exemplary embodiments, the first and second supports collectively form one or more scissor lifts each having one or more pairs of crisscrossed bars. In such embodiments, variation of the length of the adjustable bar affects the expansion and contraction of the one or more scissor lifts, and thus changes the height of the leg assembly. The leg assembly of the present disclosure can be made of various materials including but not limited to metals (e.g., iron, steel, and aluminum), plastics and woods.

A table of the present disclosure generally includes a tabletop and a leg assembly to support the tabletop. It can be of various sizes. For instance, a table of the present disclosure can be a coffee table, a dining table, a picnic table or the like. The tabletop can be of various shapes including but not limited to a square shape, a round shape or a rectangular shape, and can be made of various materials including but not limited to plastics and woods. In some exemplary embodiments, the tabletop includes a table panel made of plastics by injection molding, blow molding or any other suitable processes.

Figure 1:
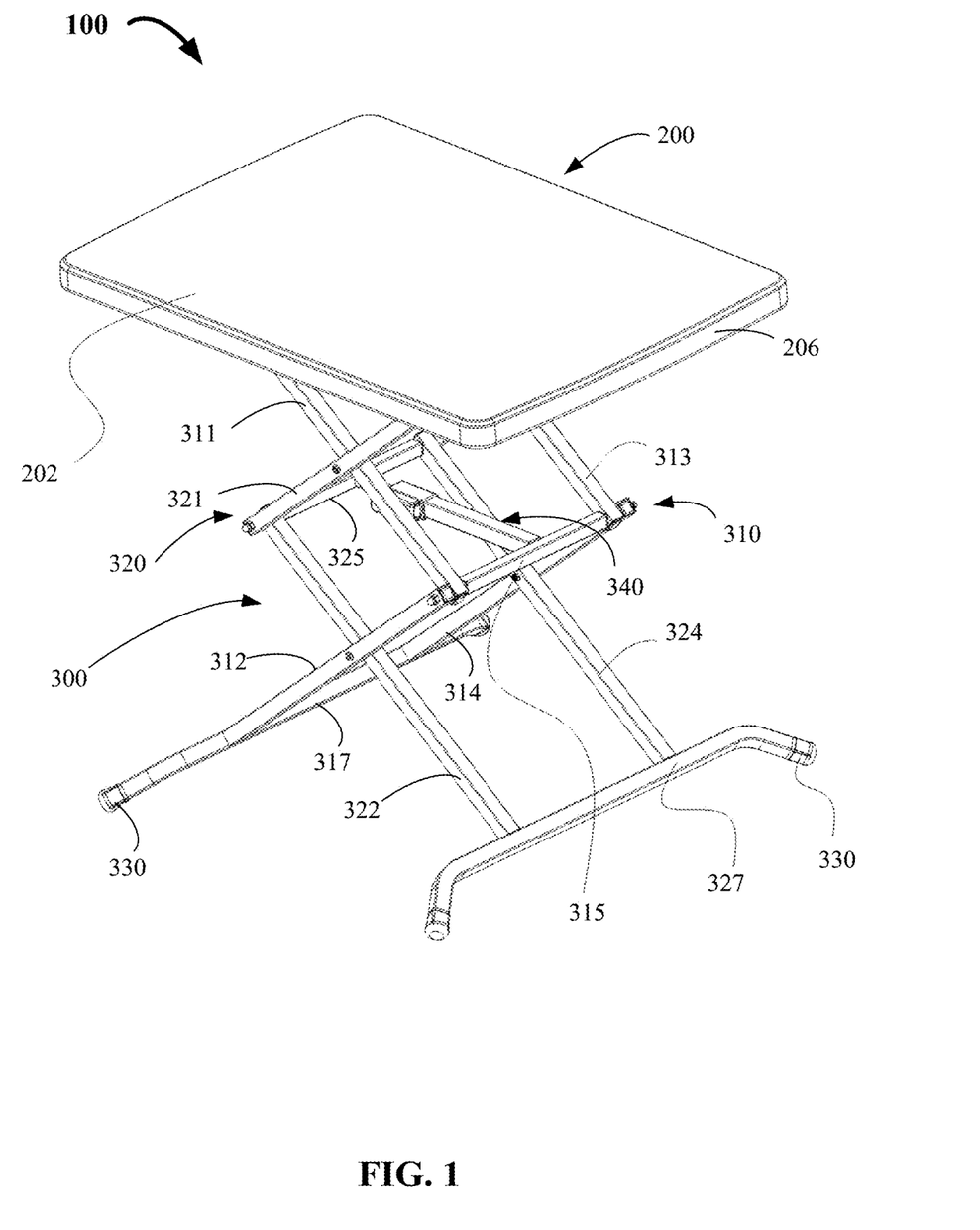
FIG. 1 is a top perspective view illustrating an exemplary table in accordance with exemplary embodiments of the present disclosure.
Figure 2:
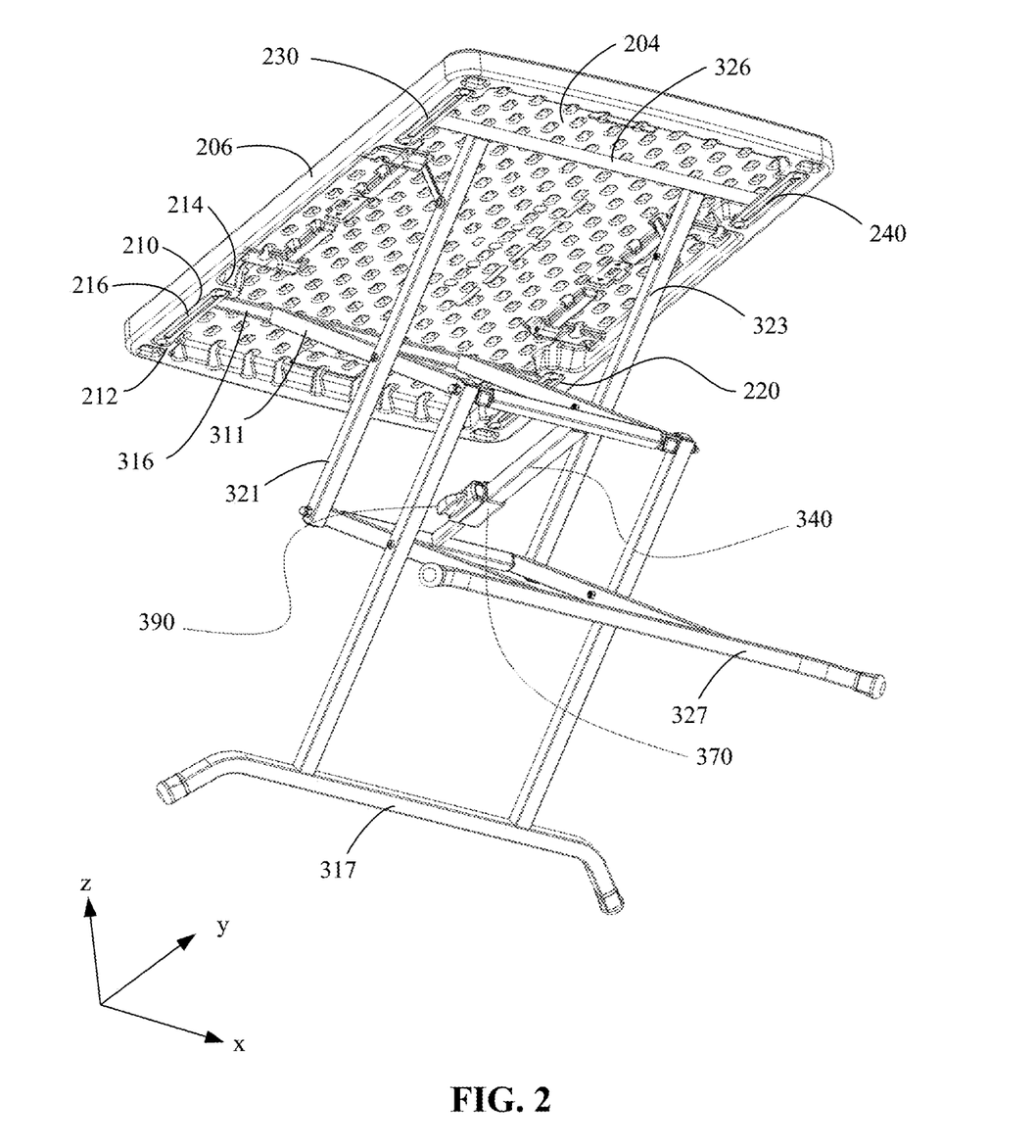
FIG. 2 is a bottom perspective view illustrating an exemplary frame in accordance with exemplary embodiments of the present disclosure.
Figure 3:
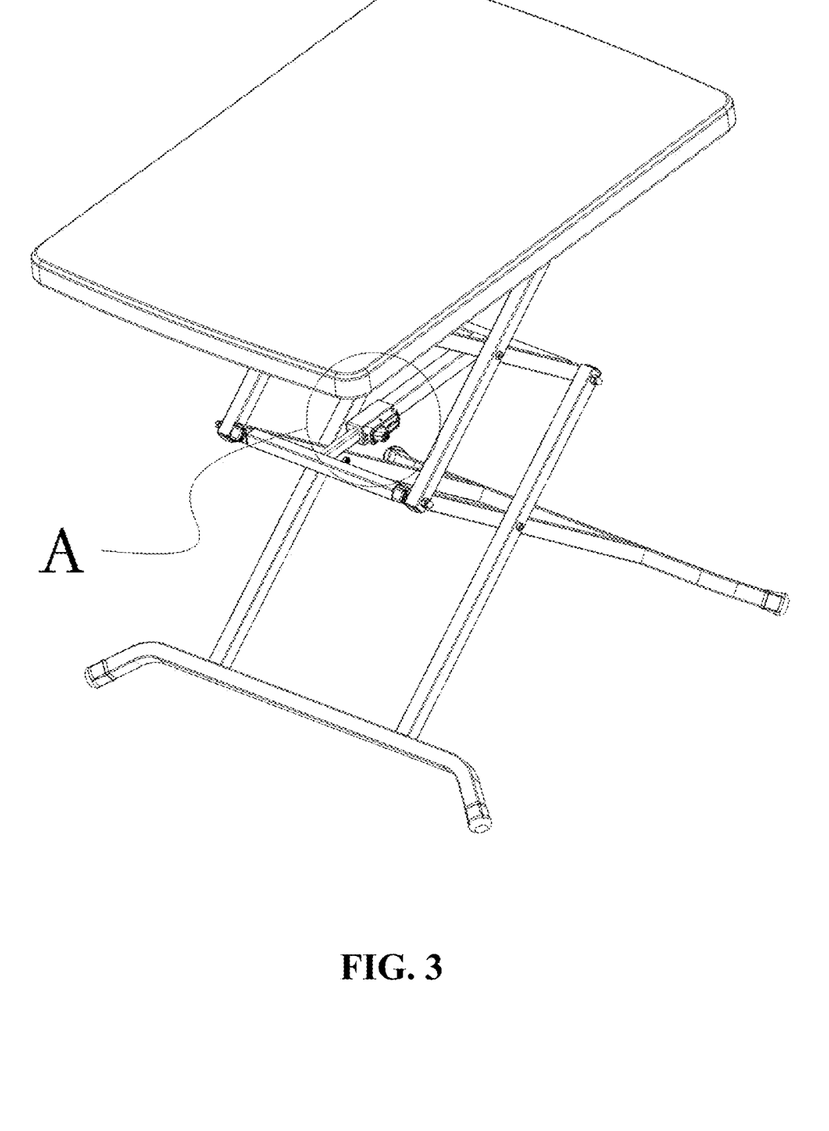
FIG. 3 is a top perspective view illustrating an exemplary table in accordance with exemplary embodiments of the present disclosure.
Figure 4:
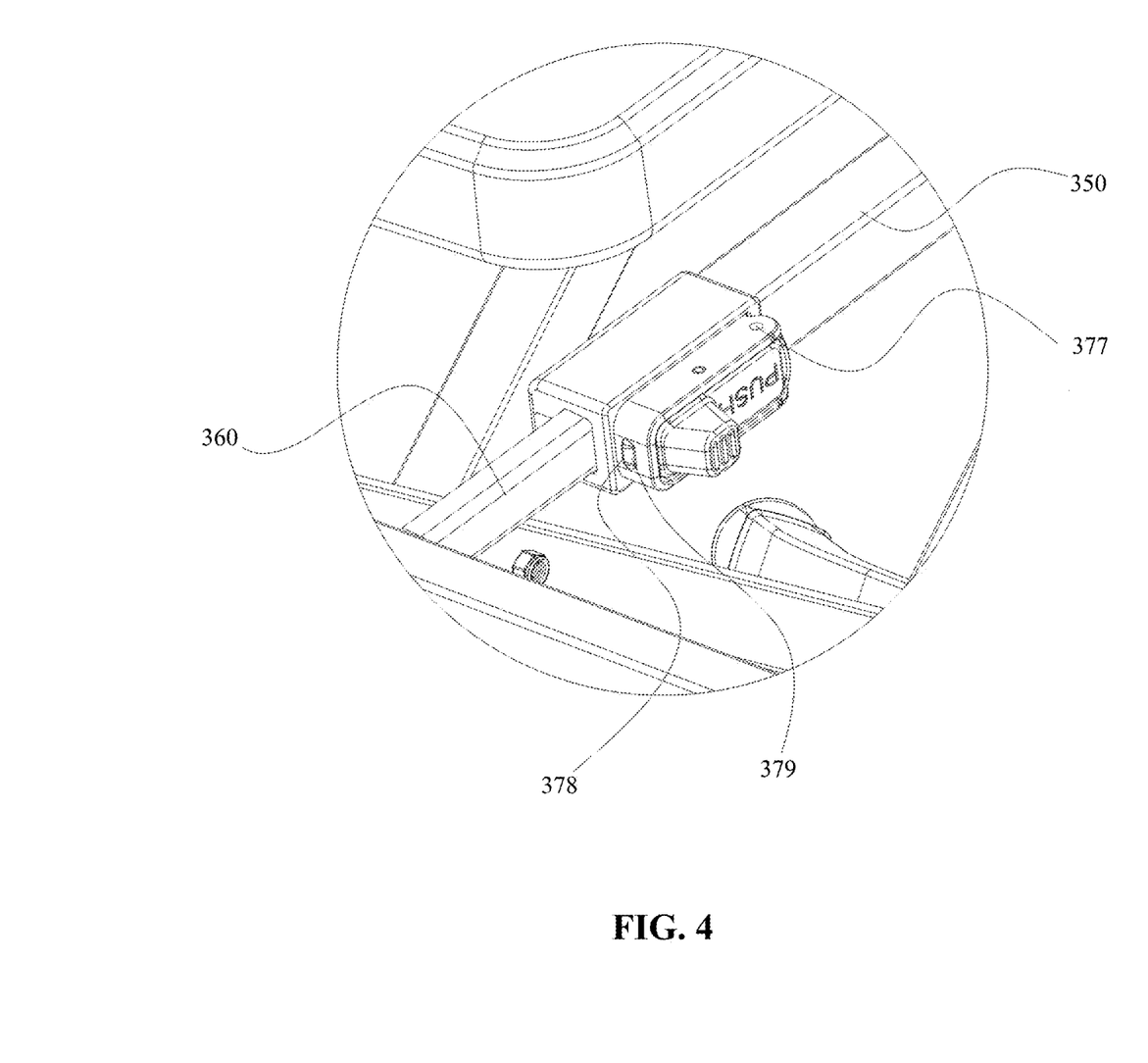
FIG. 4 is an enlarged view taken along circle A of FIG. 3.

Referring to FIGS. 1-3, there is depicted an exemplary table in accordance with some embodiments of the present disclosure. As shown, table 100 includes a tabletop such as tabletop 200 and a leg assembly such as leg assembly 300 coupled with the tabletop and supporting the tabletop when in use. While tabletop 200 is of a rectangular shape in the figures, it should be noted that tabletop 200 can be of any suitable shapes including but not limited to rectangular, square, round, oval, oblong or the like.

In various exemplary embodiments, tabletop 200 includes an upper surface such as upper surface 202, a lower surface such as lower surface 204, and an edge such as edge 206. In some exemplary embodiments, the edge is extended downward beyond the lower surface of the tabletop.

In some exemplary embodiments, tabletop 200 also includes a plurality of engagement slots for coupling with the leg assembly. For instance, by way of example, FIG. 2 illustrates first engagement slot 210, second engagement slot 220, third engagement slot 230 and fourth engagement slot 240. The first and second engagement slots are spaced apart in a first direction (e.g., x-direction in FIG. 2) of the tabletop with openings of the first and second engagement slots facing each other. The third and fourth engagement slots are spaced apart in the first direction of the tabletop with openings of the third and fourth engagement slots facing each other. It should be noted that the first and third engagement slots can be but are not necessarily aligned in a second direction (e.g., y-direction in FIG. 2), and similarly the second and fourth engagement slots can be but are not necessarily aligned in the second direction. By way of example, FIG. 2 illustrates the first and third engagement slots aligned in the second direction, and the second and fourth engagement slots aligned in the second direction.

In some exemplary embodiments, each of the first, second, third and fourth engagement slots is formed at least partially by a pair of protrusions and a holding piece. For instance, first engagement slot 210 is formed partially by a pair of protrusions such as first protrusion 212 and second protrusion 214 and a holding piece such as holding piece 216. The first and second protrusions are spaced apart in the second direction (e.g., y-direction in FIG. 2) of the tabletop. In some exemplary embodiments, the first and second protrusions are integrally formed or coupled with the lower surface of the tabletop. For instance, in an exemplary embodiment, the upper surface, the lower surface, the edge, and the plurality of pairs of protrusions are elements of a table panel formed by injection or blow molding of plastics. The first and second protrusions protrude downward from the lower surface of the tabletop, and the holding piece is fastened on first and second protrusions of the table panel. This creates a space between the holding piece and the lower surface of the tabletop and between the first and second protrusions.

While FIG. 2 illustrates the first and second protrusions at or adjacent to the edge of the tabletop, it should be noted that the first and second protrusions do not necessarily need to be disposed at or adjacent to the edge of the tabletop. For instance, in some exemplary embodiments, the first and second protrusions are spaced apart from an edge of the tabletop, or from any edge of the tabletop. It should also be noted that the first and second protrusions can be separate individual protrusions or joined protrusions connected by a connecting means, e.g., a rib, a flange, a protrusion, a recess, a channel, a depression, or the like.

The first and second protrusions of the second, third or fourth engagement slot can be configured similarly to the first engagement slot or differently from the first engagement slot. For instance, in an exemplary embodiment, the first and second protrusions of each of the second, third and fourth engagement slots are configured substantially the same as the first engagement slot, except they are disposed at different positions and/or in different orientations. In another exemplary embodiment, the first and/or second protrusions of at least one engagement slot is/are configured differently from those of the first engagement slot in terms of shape and/or size.

In various exemplary embodiments, leg assembly 300 includes a first support such as first support 310, a second support such as second support 320, and an adjustable bar such as adjustable bar 340. The first support movably connected with the tabletop at a first portion of the tabletop, and the second support movably connected with the tabletop at a second portion of the tabletop. The adjustable bar is connected with the first and second supports and configured to control the movement of the first support, the second support or both. This causes the change of the height of the leg assembly and thus the change of the height of the table.

In some exemplary embodiments, the first and second supports of the leg assembly collectively form one or more scissor lifts each including one or more pairs of crisscrossed bars. For instance, in an exemplary embodiment, the first and second supports of the leg assembly collectively form a scissor lift including a pair of crisscrossed bars, two pairs of crisscrossed bars, or more than two pairs of crisscrossed bars. In another exemplary embodiment, the first and second supports of the leg assembly collectively form a pair of scissor lifts, each scissor lift including a pair of crisscrossed bars, two pairs of crisscrossed bars, or more than two pairs of crisscrossed bars. In still another exemplary embodiment, the first and second supports of the leg assembly collectively form more than a single pair of scissor lifts.

By way of example, FIGS. 1-3 illustrate first support 310 and second support 320 collectively forming a pair of scissor lifts and each scissor lift including two pairs of crisscrossed bars. In some exemplary embodiments, first support 310 includes a first bar such as first bar 311, a second bar such as second bar 312, a third bar such as third bar 313, and a fourth bar such as fourth bar 314. The first and second bars of the first support are pivotally connected with each other at their proximal ends. The third and fourth bars of the first support are pivotally connected with each other at their proximal ends, and are spaced apart from the first and second bars of the first support. For instance, in an exemplary embodiment, first bar 311 and second bar 312 are disposed at or adjacent to one side of the table, and third bar 313 and fourth bar 314 are disposed at or adjacent to another side of the table. In some exemplary embodiments, first support 310 also includes a horizontal bar such as horizontal bar 315. The horizontal bar of the first support has a first end connected with the proximal end of the first or second bar of the first support, and a second end connected with the proximal end of the third or fourth bar of the first support.

Similarly, second support 320 includes a first bar such as first bar 321, a second bar such as second bar 322, a third bar such as third bar 323, and a fourth bar such as fourth bar 324. The first and second bars of the second support are pivotally connected with each other at their proximal ends. The third and fourth bars of the second support are pivotally connected with each other at their proximal ends, and are spaced apart from the first and second bars of the second support. For instance, in an exemplary embodiment, first bar 321 and second bar 322 are disposed at or adjacent one side of the table, and third bar 323 and fourth bar 324 are disposed at or adjacent another side of the table. In some exemplary embodiments, second support 320 also includes a horizontal bar such as horizontal bar 325. The horizontal bar of the second support has a first end connected with the proximal end of the first or second bar of the second support, and a second end connected with the proximal end of the third or fourth bar of the second support.

The first, second, third, and fourth bars of the first support are pivotally connected with the first, second, third, and fourth bars of the second support, respectively, at their middle portions. That is, the first bars of the first and second supports are pivotally connected with each other at their middle portions; the second bars of the first and second supports are pivotally connected with each other at their middle portions; the third bars of the first and second supports are pivotally connected with each other at their middle portions; and the fourth bars of the first and second supports are pivotally connected with each other at their middle portions. As such, the first and second supports collectively form a pair of scissor lifts, each scissor lift including two pairs of crisscrossed bars. It should be noted that the pivotal connection point at the middle portions can be but is not necessarily a central point of the bars.

In some exemplary embodiments, first support 310 also includes an upper crossbar such as upper crossbar 316, to which distal ends of the first and third bars of the first support are connected. The upper crossbar of the first support is movably connected with the tabletop. For instance, in an exemplary embodiment, the upper crossbar of the first support has a first end received in the first engagement slot (e.g., inserted into the space between the holding piece and the lower surface of the tabletop and between the first and second protrusions) and a second end received in the second engagement slot. The first and second engagement slots allow the upper crossbar of the first support to be slidable along the first and second engagement slots in the second direction (e.g., the y-direction in FIG. 2) of the tabletop and rotatable crosswise with respect to the first and second engagement slots.

Similarly, in some exemplary embodiments, second support 320 also includes an upper crossbar such as upper crossbar 326, to which distal ends of the first and third bars of the second support are connected. The upper crossbar of the second support is movably connected with the tabletop. For instance, in an exemplary embodiment, the upper crossbar of the second support has a first end received in the third engagement slot and a second end received in the fourth engagement slot. The third and fourth engagement slots allow the upper crossbar of the second support to be slidable along the third and fourth engagement slots in the second direction of the tabletop, and rotatable crosswise with respect to the first and second engagement slots.

In some exemplary embodiments, first support 310 further includes a lower crossbar such as lower crossbar 317, to which distal ends of the second and fourth bars of the first support are connected. In an exemplary embodiment, the lower crossbar of the first support includes first and second free ends bent downward, and an anti-slip base such as base 330 is coupled to each of the first and second free ends of the lower crossbar.

Similarly, in some exemplary embodiments, second support 320 further includes a lower crossbar such as lower crossbar 327, to which distal ends of the second and fourth bars of the second support are connected. In an exemplary embodiment, the lower crossbar of the second support includes first and second free ends bent downward, and an anti-slip base such as base 330 is coupled to each of the first and second free ends of the lower crossbar.

In various exemplary embodiments, adjustable bar 340 is disposed substantially perpendicular to a height direction (e.g., the z-direction in FIG. 2) of the leg assembly. The adjustable bar has a first end connected with the first support and a second end connected with the second support such that changing a length of the adjustable bar changes a height of the leg assembly. The first end of the adjustable bar can be connected to any suitable bar (e.g., the first, second, third, fourth or horizontal bar) of the first support, and the second end of the adjustable bar can be connected to any corresponding bar (e.g., the first, second, third, fourth or horizontal bar) of the second support. By way of example, FIGS. 1-3 illustrate the adjustable bar connected with the horizontal bars of the first and second supports.

Referring to FIGS. 2 and 4-6, in some exemplary embodiments, adjustable bar 340 includes an outer bar such as outer bar 350, an inner bar such as inner bar 360, and a locking/unlocking mechanism such as locking/unlocking mechanism 370 configured to control movement of the inner bar with respect to the outer tubular bar.

In some exemplary embodiments, the outer bar is a tubular bar. As used herein, the term "tubular bar" refers to an elongated bar that is hollow along a portion or an entire length of the bar. The cross section of a tubular bar can be of any suitable shape, e.g., regular or irregular, including, but not limited to, circular, polygonal and oval and oblong. In an exemplary embodiment, the inner bar is a solid flat piece. In another exemplary embodiment, the inner bar is a tubular bar. In some exemplary embodiments, the outer bar and the inner bar are movably coupled to each other, with at least a portion of the inner bar being inserted in the outer tubular bar. For instance, the inner bar includes a proximal end disposed inside the outer tubular bar, and a distal end disposed outside of the outer tubular bar.

In some exemplary embodiments, the outer tubular bar includes a first restriction hole such as first restriction hole 352. The first restriction hole is formed on a first wall of the outer tubular bar. In an exemplary embodiment, the first restriction hole of the outer tubular bar is formed at a position adjacent a proximal end of the outer tubular bar. The first restriction hole can be of various shapes including but not limited to circle, oval, square, diamond or the like.

The inner bar includes one or more restriction members formed at a first wall of the inner bar corresponding to the first restriction hole of the outer tubular bar. A restriction member can be a restriction hole, a one-way restriction structure having a restriction slot and a restriction tongue, or any other suitable restriction formations.

Figure 6A:
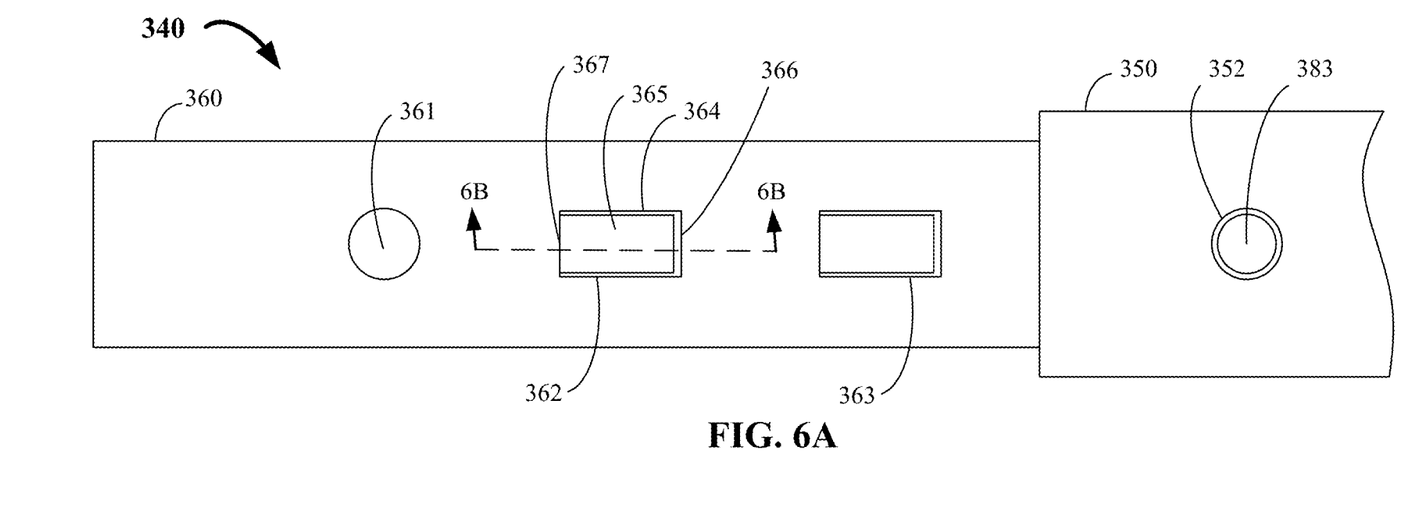
FIG. 6A is a side view illustrating an exemplary adjustable bar in accordance with exemplary embodiments of the present disclosure.
Figure 6B:
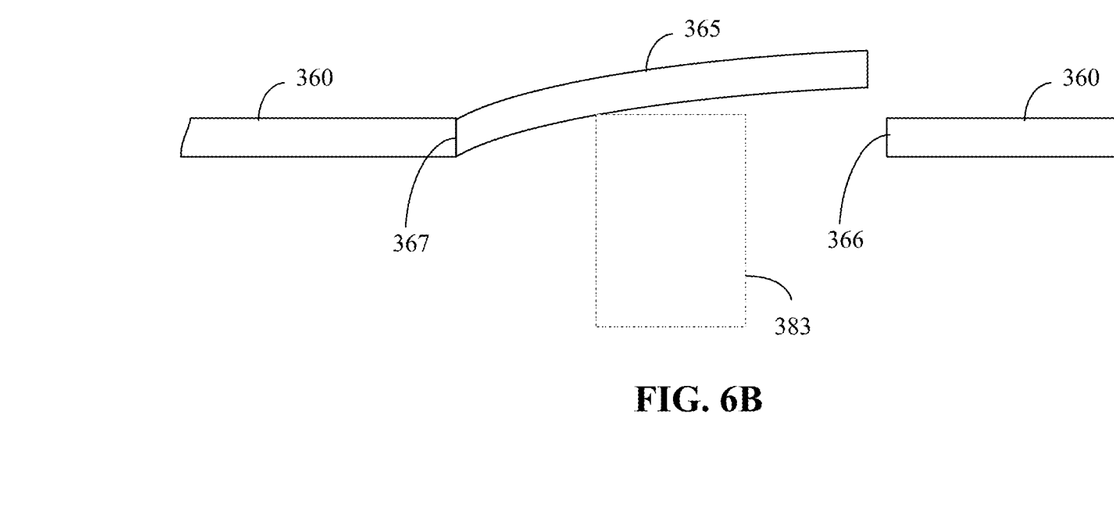
FIG. 6B is a schematic cross-sectional view taken along line 6B-6B of FIG. 6A.
Figure 7A:
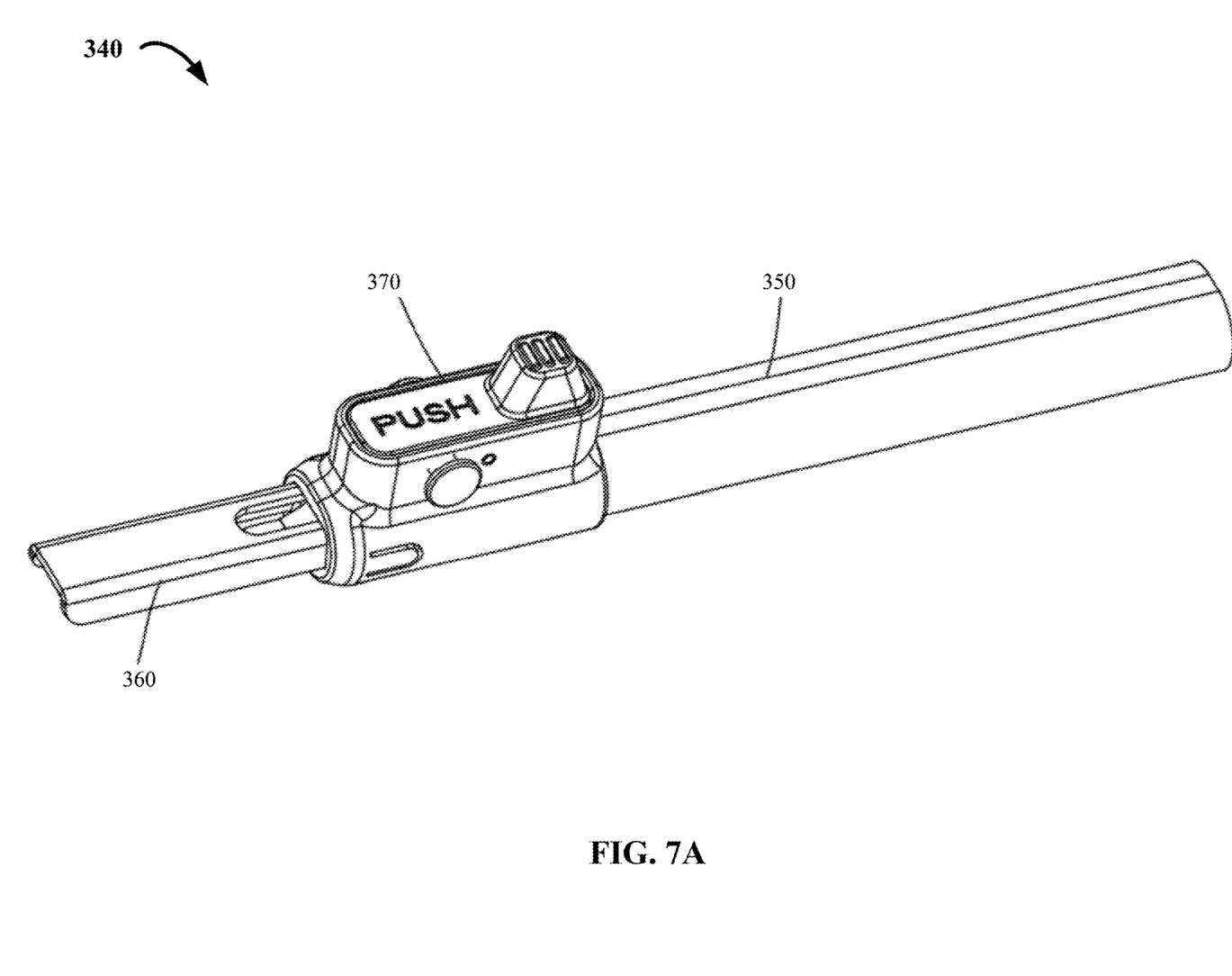
FIG. 7A is a perspective view illustrating an exemplary adjustable bar in accordance with exemplary embodiments of the present disclosure.
Figure 7B:
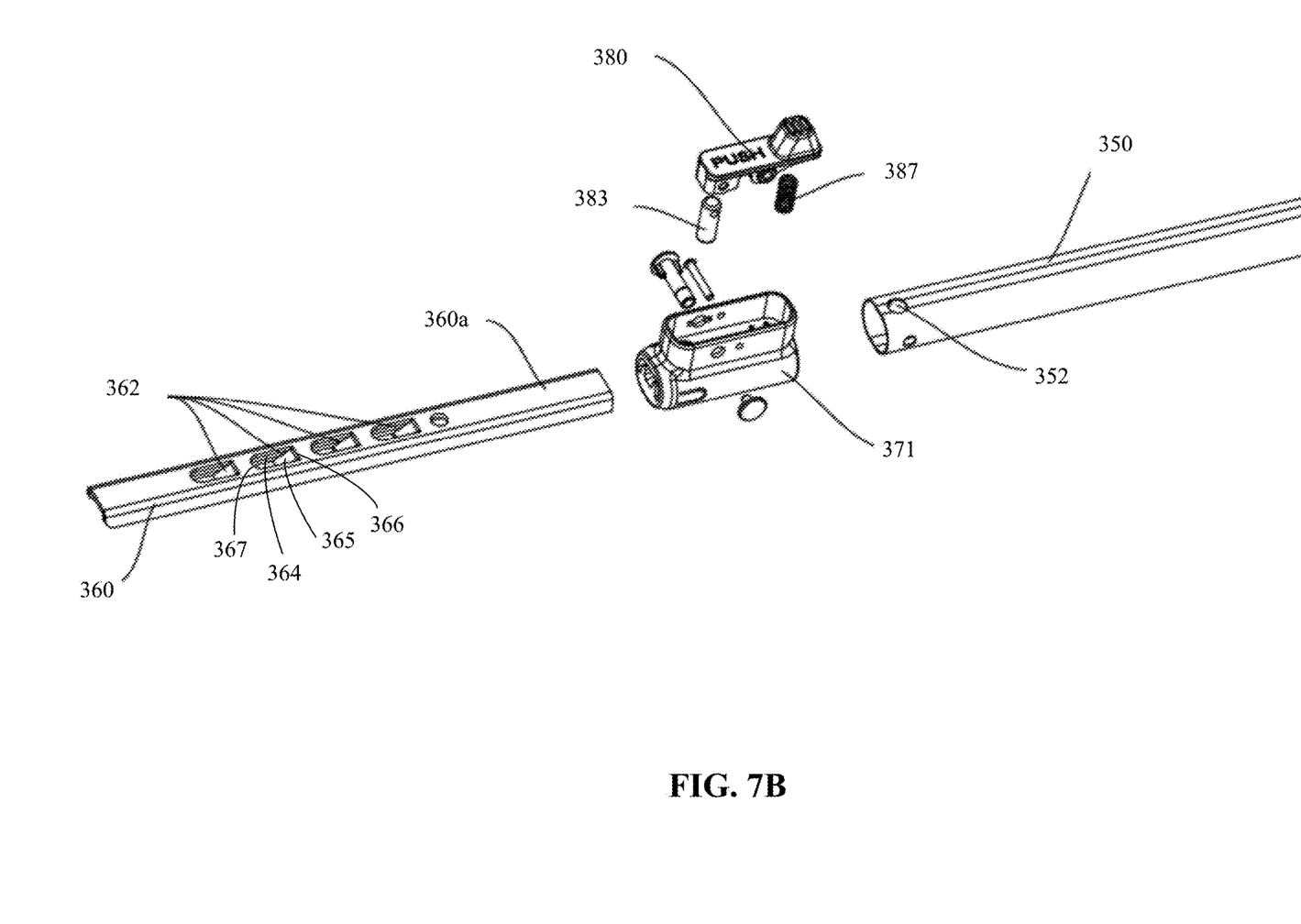
FIG. 7B is a disassembled view illustrating the exemplary adjustable bar of FIG. 7A.
Figure 7C:
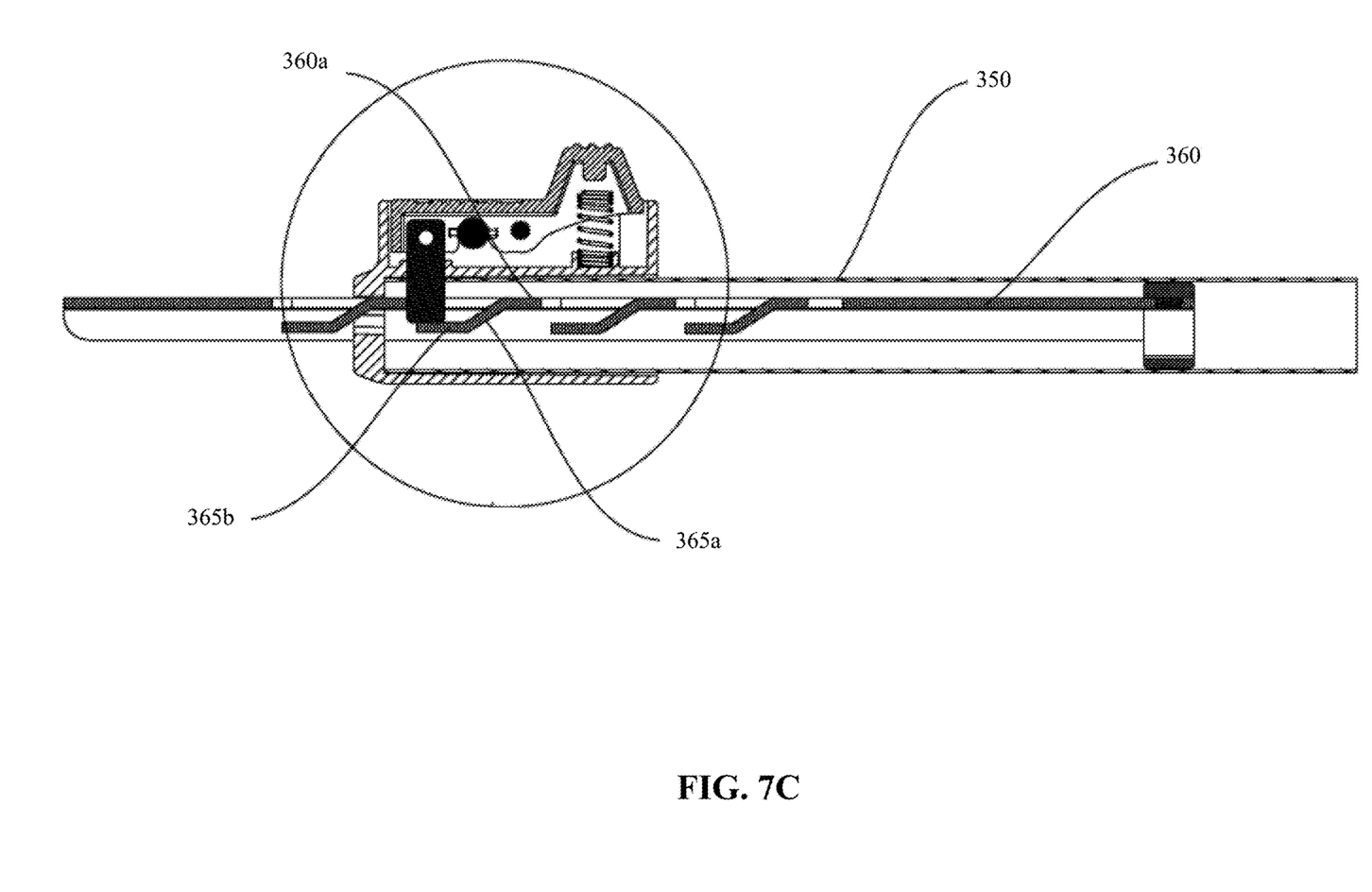
FIG. 7C is a schematic cross-sectional view illustrating the exemplary adjustable bar of FIG. 7A.

For instance, by way of example, FIG. 6A illustrates the inner bar including a second restriction hole such as second restriction hole 361, a first one-way restriction structure such as first one-way restriction structure 362 and a second one-way restriction structure 363 formed at the first wall of the inner bar. The first one-way restriction structure includes a restriction slot such as restriction slot 364 and a restriction tongue such as restriction tongue 365. Restriction slot 364 is formed at the first wall of the inner bar. Restriction slot 364 includes a proximal edge such as proximal edge 366 toward the proximal end of the inner bar and a distal edge such as distal edge 367 toward the distal end of the inner bar. Restriction tongue 365 is integrally formed or connected with one of the proximal and distal edges of the restriction slot and curved inwardly with respect to the first wall of the inner bar along the length direction of the inner bar toward the other of the proximal and distal edges of the restriction slot. By way of example, FIGS. 6A and 6B illustrate restriction tongue 365 integrally formed or connected with distal edge 367 and curved inwardly toward proximal edge 366. As another example, FIGS. 7A-7C illustrate restriction tongue 365 integrally formed or connected with proximal edge 366 and curved inwardly with respect to first wall 360a toward proximal edge 367. The inwardly curved restriction tongue can take various forms, including but not limited to a smooth curve as illustrated in FIG. 6B, a stepwise curve including a step such as step 365b and a sloped portion such as sloped portion 365a connecting the step with the proximal or distal edge as illustrated in FIG. 7C. In an exemplary embodiment, the second one-way restriction structure is configured substantially the same as the first one-way restriction structure.

It should be noted that the inner bar can include any suitable number of restriction holes, any suitable number of one-way restriction structures, or any combination of restriction hole(s) and one-way restriction structure(s). For instance, in an exemplary embodiment, the inner bar includes one or more restriction holes, which can be of the same configuration (e.g., with the same shape and size) or different configurations. In another exemplary embodiment, the inner bar includes one or more one-way restriction structures, which can be of the same configuration or different configurations. In still another exemplary embodiment, the inner bar includes a combination of restriction hole(s) and one-way restriction structure(s).

Referring back to FIG. 5, in some exemplary embodiments, locking/unlocking mechanism 370 includes a base such as base 371 fixedly coupled with (e.g., snap-fitted, fastened, glued) the outer tubular bar, for instance, at or adjacent the proximal end of the outer tubular bar. The base 371 includes a first side wall such as first side wall 372, where a base hole such as base hole 373 and a base pillar such as base pillar 374 are formed at the first side wall of the base. The base hole is positioned in accordance with the first restriction hole of the outer tubular bar such that the first restriction hole of the outer tubular bar is accessible through the base hole. In some exemplary embodiments, the base hole and base pillar are formed at the first side wall of the base side by side along the length direction of the outer tubular bar.

Figure 5:
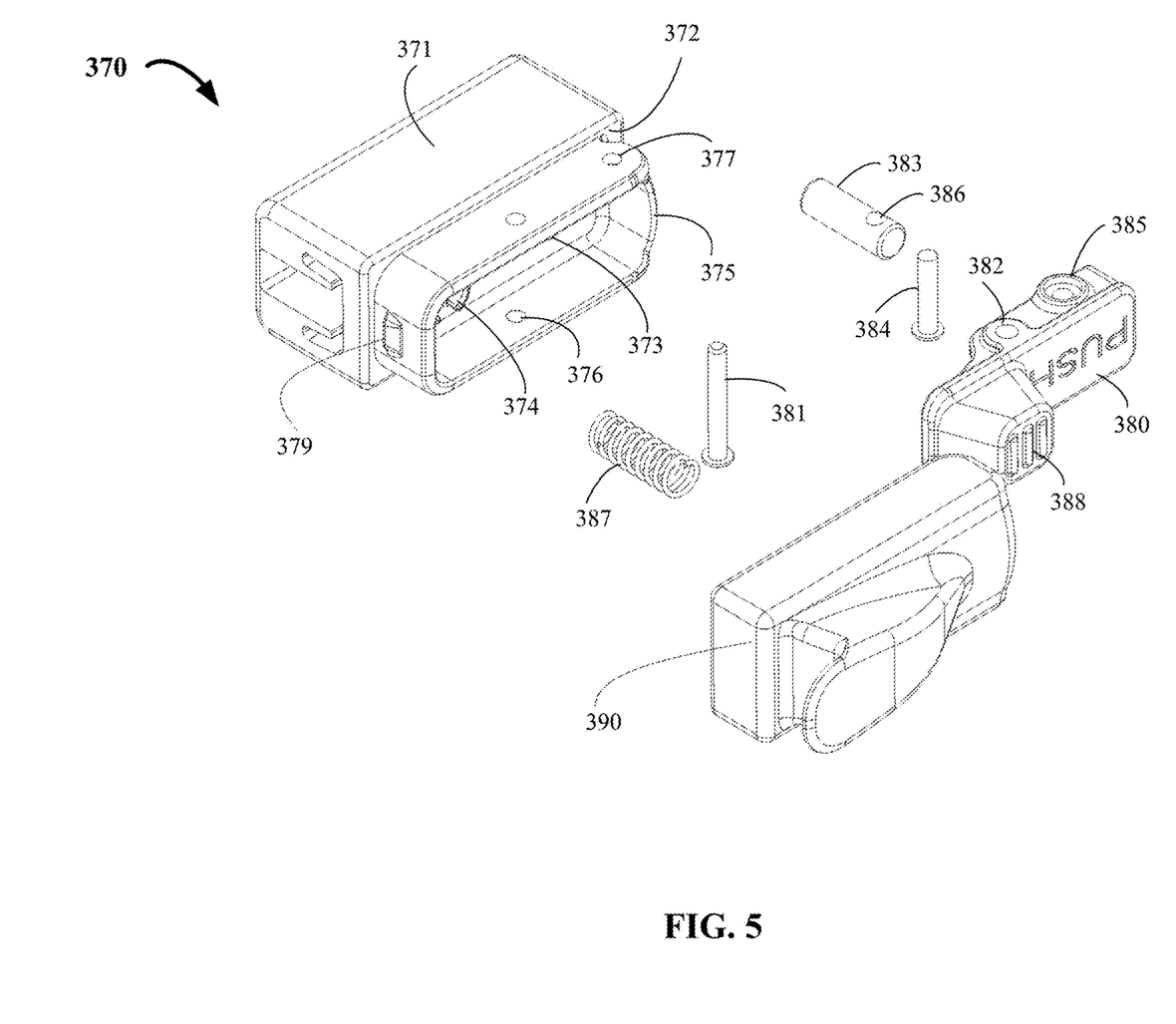
FIG. 5 is a disassembled view illustrating an exemplary locking/unlocking mechanism in accordance with exemplary embodiments of the present disclosure.

In some exemplary embodiments, locking/unlocking mechanism 370 includes casing 375 integrally formed (e.g., by molding) or coupled (e.g., glued or fastened) with the first side wall of the base. Casing 375 can have any suitable shapes provided that it encloses or surrounds the base hole and base pillar formed at the first side wall of the base. In an exemplary embodiment, casing 375 is formed by a circumferential wall extended from the first side wall of the base, e.g., a portion of the first side wall of the base serves as the bottom of casing 375.

In some exemplary embodiments, locking/unlocking mechanism 370 includes a lever such as lever 380 pivotally connected with the casing. For instance, in some exemplary embodiments, lever 380 includes a first end portion aligned with the base hole of the base, a second end portion aligned with the base pillar of the base, and a middle portion between the first and second portions. In an exemplary embodiment, the middle portion of the lever is pivotally connected with the casing by a rod such as rod 381 passing through a hole such as hole 376 formed at the casing and a hole such as hole 382 formed at the middle portion of the lever.

In some exemplary embodiments, locking/unlocking mechanism 370 includes a pin such as pin 383 integrally formed or coupled with the first end portion of the level and having a free end toward the base hole formed at the first side wall of the base. For instance, in an exemplary embodiment, pin 383 is coupled with the first end portion of the lever by a rod such as rod 384 that passes a hole such as hole 385 formed at the first portion of the lever and a hole such as hole 386 formed at the pin.

In some exemplary embodiments, locking/unlocking mechanism 370 includes an elastic member such as elastic member 387 engaged with the base pillar formed at the first side wall of the base. Elastic member 387 has a first end abutting the bottom of the casing (e.g., the first side wall of the base) and a second end abutting the second portion of the lever. Thus, when any restriction member (e.g., restriction hole or one-way restriction structure) of the inner bar aligns with the first restriction hole of the outer tubular bar, elastic member 387 pushes the free end of pin 383 into the restriction member of the inner bar. Depending on the configuration of the restriction member of the inner bar, the inner bar is restricted from moving along the length direction of the outer tubular bar in both directions, or is restricted from moving along the length direction of the outer tubular bar in one direction but allowed to move along the length direction of the outer tubular bar in another direction.

For instance, referring in particular to FIGS. 6A and 6B, when second restriction hole 361 of the inner bar aligns with first restriction hole 352 of the outer tubular bar, elastic member 387 pushes the free end of pin 383 into second restriction hole 361 of the inner bar. As such, the inner bar is restricted from moving along the length direction of the outer tubular bar in both directions (e.g., left and right directions in FIG. 6A). When first one-way restriction structure 362 of the inner bar aligns with first restriction hole 382 of the outer tubular bar, elastic member 387 pushes the free end of pin 383 into restriction slot 364 of first one-way restriction structure 362 of the inner bar. Since restriction tongue 365 is integrally formed or connected with distal edge 367, it pushes the pin out of the restriction slot when the pin is adjacent the distal edge of the restriction slot, thereby allowing the inner bar to move toward the outer tubular bar. Since restriction tongue 365 is curved inwardly toward proximal edge 366, the free end of the pin remains in the restriction slot adjacent the proximal edge of the restriction slot, thereby restricting the inner bar from moving away from the outer tubular bar.

Pressing the second portion of the lever toward the base will pull the free end of pin 383 out of the restriction member of the inner bar or out of both the restriction member of the inner bar and the first restriction hole of the outer tubular bar. This disengages the inner bar from the outer tubular bar, and thus allows the inner bar to move in both directions along the length direction of the outer tubular bar. In some exemplary embodiments, the second portion of the lever includes a protrusion such as protrusion 388 that is protruded outside of the casing to facilitate easy pressing of the second portion of the lever.

In some exemplary embodiments, locking/unlocking mechanism 370 includes a cover such as cover 390 to prevent accidental press of the second portion of the lever toward the base or accidental release of the pin from the restriction member (e.g., second restriction hole or restriction slot of a one-way restriction structure) of the inner bar. In some exemplary embodiments, the cover has a first portion pivotally coupled with the casing and a second portion snap-fitted with the casing. For instance, in some exemplary embodiments, the casing includes a hole such as hole 377 formed at a first side wall of the casing for pivotally coupling the first portion of the cover and a protrusion such as protrusion 378 at a second side wall of the casing for snap-fitting the second portion of the cover. In an exemplary embodiment, protrusion 378 includes a sloped surface such as sloped surface 379 to help engage the second portion of the cover with the casing The adjustable bars, leg assemblies and tables of the present disclosure have several advantages. For instance, due to at least in part the configurations of the one-way restriction structure(s) of the inner bar and the scissor lift formed by the first and second support, the leg assembly can expand (e.g., increase the length of the leg assembly) without any additional restrictions. In other words, the table can be unfolded from its folded state or adjusted to a greater height by simply lifting the tabletop. As such, the tables of the present disclosure are very convenient to use. Moreover, since the locking/unlocking mechanism includes a cover, the pin and the lever are not exposed to outside when the table is in use. As such, accidental folding of the tables is prevented, and thus the tables of the present disclosure are safer to use.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first bar could be termed a second bar, and, similarly, a second bar could be termed a first bar, without changing the meaning of the description, so long as all occurrences of the "first bar" are renamed consistently and all occurrences of the "second bar" are renamed consistently.

What is claimed is:

1. An adjustable bar comprising:
    an outer tubular bar comprising a first restriction hole formed on a first wall of the outer tubular bar;
    an inner bar comprising:
        a proximal end disposed inside the outer tubular bar;
        a distal end disposed outside of the outer tubular bar; and
        at least one restriction member, wherein the at least one restriction member comprises a second restriction hole formed at a first wall of the inner bar corresponding to the first restriction hole of the outer tubular bar; and
    a locking/unlocking mechanism configured to control movement of the inner bar with respect to the outer tubular bar, the locking/unlocking mechanism comprising:
        a base fixedly coupled with the outer tubular bar;
        a casing integrally formed or coupled with the base for housing a pin, wherein the pin is selectively inserted into the first restriction hole of the outer tubular bar and the second restriction hole of the inner bar, thereby selectively restricting movement of the inner bar with respect to the outer tubular bar; and
        a cover having a first portion pivotally coupled with the casing and a second portion snap-fitted with the casing, wherein the cover prevents accidental release of the pin from the second restriction hole of the inner bar or from both of the first restriction hole of the outer tubular bar and the second restriction hole of the inner bar.

2. The adjustable bar of claim 1, wherein the casing comprises a hole formed at a first side wall of the casing for pivotally coupling the first portion of the cover and a protrusion at a second side wall of the casing for snap-fitting the second portion of the cover.

3. A leg assembly comprising:
    a first support;
    a second support; and
    the adjustable bar of claim 1 disposed substantially perpendicular to a height direction of the leg assembly, the adjustable bar having a first end connected with the first support and a second end connected with the second support such that changing a length of the adjustable bar changes a height of the leg assembly,
    wherein when the pin is inserted into the first restriction hole of the outer tubular bar and the second restriction hole of the inner bar, adjusting the height of the leg assembly is restricted.

4. A table comprising:
    a tabletop; and
    a leg assembly to support the tabletop, the leg assembly comprising:
        a first support movably connected with the table top at a first portion of the table top;
        a second support movably connected with the table top at a second portion of the table top; and
        the adjustable bar of claim 1 disposed substantially perpendicular to a height direction of the leg assembly, the adjustable bar having a first end connected with the first support and a second end connected with the second support such that changing a length of the adjustable bar changes a height of the leg assembly,
    wherein when the pin is inserted into the first restriction hole of the outer tubular bar and the second restriction hole of the inner bar, adjusting the height of the leg assembly is restricted.

5. An adjustable bar comprising:
    an outer tubular bar comprising a first restriction hole formed on a first wall of the outer tubular bar;
    an inner bar comprising:
        a proximal end disposed inside the outer tubular bar;
        a distal end disposed outside of the outer tubular bar; and
        at least one restriction member, wherein the at least one restriction member comprises one or more one-way restriction structures disposed between the proximal end and distal end of the inner bar and spaced apart along a length direction of the inner bar, wherein each one-way restriction structure in the one or more one-way restriction structures comprises:
            a restriction slot formed at a first wall of the inner bar and comprising a proximal edge toward the proximal end of the inner bar and a distal edge toward the distal end of the inner bar; and
            a restriction tongue integrally formed or connected with one of the proximal and distal edges of the restriction slot and curved inwardly with respect to the first wall of the inner bar along the length direction of the inner bar toward the other of the proximal and distal edges of the restriction slot; and
    a locking/unlocking mechanism configured to control movement of the inner bar with respect to the outer tubular bar, the locking/unlocking mechanism comprising a pin to be selectively inserted into the first restriction hole of the outer tubular bar and the restriction slot of any one of the one or more one-way restriction structures of the inner bar, thereby selectively restricting the inner bar from moving along the length direction of the outer tubular bar in one direction but allowing the inner bar to move along the length direction of the outer tubular bar in another direction.

6. The adjustable bar of claim 5, wherein the restriction tongue is integrally formed or connected with the distal edge of the restriction slot and curved inwardly with respect to the first wall of the inner bar along the length direction of the inner bar toward the proximal edge of the restriction slot, wherein each one-way restriction structure in the one or more one-way restriction structures of the inner bar restricts the inner bar from moving away from the outer tubular bar along the length direction of the outer tubular bar but allows the inner bar to move toward the outer tubular bar along the length direction of the outer tubular bar.

7. The adjustable bar of claim 5, wherein the at least one restriction member further comprises:
a second restriction hole formed at the first wall of the inner bar between the proximal and distal ends of the inner bar,
wherein the pin is selectively inserted into the first restriction hole of the outer tubular bar and the second restriction hole of the inner bar, thereby restricting the inner bar from moving along the length direction of the outer tubular bar.

8. The adjustable bar of claim 5, wherein the locking/unlocking mechanism further comprises:
a base comprising a base hole and a base pillar formed at a first side wall of the base, wherein the base hole is aligned with the first restriction hole of the outer tubular bar;
a casing integrally formed or coupled with the first side wall of the base and surrounding the base hole and the base pillar;
a lever comprising a first end portion aligned with the base hole, a second end portion aligned with the base pillar, and a middle portion between the first and second portions and pivotally connected with the casing, wherein the pin is integrally formed or coupled with the first end portion of the level, and has a free end toward the base hole; and
an elastic member engaged with the base pillar, and having a first end abutting the first side wall of the base and a second end abutting the second portion of the lever, wherein when the restriction slot of any one of the one or more one-way restriction structures of the inner bar aligns with the first restriction hole of the outer tubular bar, the elastic member pushes the pin into the restriction slot of the inner bar.

9. The adjustable bar of claim 5, wherein the locking/unlocking mechanism further comprises:
a base fixedly coupled with the outer tubular bar;
a casing integrally formed or coupled with the base for housing the pin; and
a cover having a first portion pivotally coupled with the casing and a second portion snap-fitted with the casing, wherein the cover prevents accidental release of the pin from the restriction slot of any one of the one or more one-way restriction structures of the inner bar or from both of the first restriction hole of the outer tubular bar and the restriction slot of the inner bar.

10. A leg assembly comprising:
a first support;
a second support; and
the adjustable bar of claim 5, disposed substantially perpendicular to a height direction of the leg assembly, the adjustable bar having a first end connected with the first support and a second end connected with the second support such that changing a length of the adjustable bar changes a height of the leg assembly,
wherein when the pin is inserted into the first restriction hole of the outer tubular bar and the restriction slot of any one of the one or more one-way restriction structures of the inner bar, reducing the height of the leg assembly is restricted and increasing the height of the leg assembly is allowed.

11. A table comprising:
a tabletop; and
a leg assembly to support the tabletop, the leg assembly comprising:
a first support movably connected with the table top at a first portion of the table top;
a second support movably connected with the table top at a second portion of the table top; and
the adjustable bar of claim 5, disposed substantially perpendicular to a height direction of the leg assembly, the adjustable bar having a first end connected with the first support and a second end connected with the second support such that changing a length of the adjustable bar changes a height of the leg assembly,
wherein when the pin is inserted into the first restriction hole of the outer tubular bar and the restriction slot of any one of the one or more one-way restriction structures of the inner bar, reducing the height of the leg assembly is restricted and increasing the height of the leg assembly is allowed.

12. The table of claim 11, wherein the at least one restriction member of the inner bar of the adjustable bar further comprises:
a second restriction hole formed at the first wall of the inner bar between the proximal and distal ends of the inner bar, wherein when the pin is inserted into the first restriction hole of the outer tubular bar and the second restriction hole of the inner bar, adjusting the height of the leg assembly is restricted.

13. The table of claim 11, wherein the first and second supports collectively form a pair of scissor lifts that are spaced apart, with each scissor lift comprising one or more pairs of crisscrossed bars, wherein the pair of scissor lifts are connected with each other by a first horizontal bar and a second horizontal bar, wherein the adjustable bar has the first end connected with the first horizontal bar and the second end connected with the second horizontal bar.

14. The table of claim 11, wherein each of the first and second supports comprises:
a first bar and a second bar pivotally connected with each other at proximal ends thereof;
a third bar and a fourth bar pivotally connected with each other at proximal ends thereof, wherein the third and fourth bars are spaced apart from the first and second bars;
a horizontal bar having a first end connected with the proximal end of the first or second bar, and a second end connected with the proximal end of the third or fourth bar,
wherein the first, second, third, and fourth bars of the first support are pivotally connected with the first, second, third, and fourth bars of the second support, respectively, at middle portions thereof;

wherein the adjustable bar has the first end connected with the horizontal bar of the first support and the second end connected with the horizontal bar of the second support.

15. The table of claim 14, wherein each of the first and second supports further comprises:

an upper crossbar movably connected with the tabletop, wherein distal ends of the first and third bars are connected to the upper crossbar; and a lower crossbar, wherein distal ends of the second and fourth bars are connected to the lower crossbar.

16. The table of claim 15, wherein the lower crossbar comprises first and second free ends bent downward, wherein an anti-slip base is coupled to each of the first and second free ends of the lower crossbar.

17. The table of claim 11, wherein the restriction tongue is integrally formed or connected with the distal edge of the restriction slot and curved inwardly with respect to the first wall of the inner bar along the length direction of the inner bar toward the proximal edge of the restriction slot, wherein each one-way restriction structure in the one or more one-way restriction structures of the inner bar restricts the inner bar from moving away from the outer tubular bar along the length direction of the outer tubular bar but allows the inner bar to move toward the outer tubular bar along the length direction of the outer tubular bar.

18. The table of claim 11, wherein:

the tabletop comprises first, second, third and fourth engagement slots, wherein the first and second engagement slots are spaced apart in a first direction of the tabletop with openings of the first and second engagement slots facing each other; and the third and fourth engagement slots are spaced apart in the first direction of the tabletop with openings of the third and fourth engagement slots facing each other;

the first support of the leg assembly comprises a first upper crossbar having a first end received in the first engagement slot and a second end received in the second engagement slot; and the second support comprising a second upper crossbar having a first end received in the third engagement slot and a second end received in the fourth engagement slot.

19. The table of claim 18, wherein each of the first, second, third and fourth engagement slots is formed at least partially by a pair of protrusions and a holding piece, wherein the pair of protrusions comprises a first protrusion and a second protrusion that are spaced apart in the second direction of the tabletop, integrally formed or coupled with the lower surface of the tabletop, and protruded downward from the lower surface of the tabletop; and the holding piece is fastened on first and second protrusions of the tabletop.

20. The adjustable bar of claim 5, wherein the restriction tongue is integrally formed or connected with the proximal edge of the restriction slot and curved inwardly with respect to the first wall of the inner bar along the length direction of the inner bar toward the distal edge of the restriction slot, wherein each one-way restriction structure in the one or more one-way restriction structures of the inner bar restricts the inner bar from moving toward the outer tubular bar along the length direction of the outer tubular bar but allows the inner bar to move away from the outer tubular bar along the length direction of the outer tubular bar.

* * * * *